United States Patent
Beyne et al.

(10) Patent No.: US 6,362,484 B1
(45) Date of Patent: *Mar. 26, 2002

(54) IMAGER OR PARTICLE OR RADIATION DETECTOR AND METHOD OF MANUFACTURING THE SAME

(75) Inventors: Eric Beyne, Leuven (BE); Amos Breskin, Nes-Ziona; Rachel Chechik, Moshav Beit Hanan, both of (IL); Stefaan Tavernier, Hoeilaart; Walter Van Doninck, Brussell, both of (BE)

(73) Assignee: Imec vzw, Leuven (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/247,627

(22) Filed: Feb. 10, 1999

Related U.S. Application Data

(63) Continuation-in-part of application No. 09/021,221, filed on Feb. 10, 1998, now Pat. No. 6,121,622, which is a continuation-in-part of application No. 08/682,835, filed on Jul. 12, 1996, now Pat. No. 5,731,584.
(60) Provisional application No. 60/001,489, filed on Jul. 14, 1995.

(30) Foreign Application Priority Data

Jul. 23, 1998 (EP) .............................................. 98202476

(51) Int. Cl.[7] .............................. G01J 5/28; H01J 40/06
(52) U.S. Cl. ................ 250/374; 250/338.4; 250/370.01; 250/372
(58) Field of Search ............................. 250/374, 338.4, 250/370.01, 372, 375, 378, 361 R

(56) References Cited

U.S. PATENT DOCUMENTS

| | | | | |
|---|---|---|---|---|
| 5,349,194 A | * | 9/1994 | Wuest et al. | 250/372 |
| 5,731,584 A | * | 3/1998 | Beyne et al. | 250/374 |
| 6,121,622 A | * | 9/2000 | Beyne et al. | 250/374 |

FOREIGN PATENT DOCUMENTS

FR   2 739 941 A1   4/1997

OTHER PUBLICATIONS

Biagi, S.F. and Jones, T.J., "The microdot gas avalanche chamber: an investigation of new geometries", Nuclear Instruments and Methods in Physics Reasearch, Jan. 26, 1995, pp. 72–76.

(List continued on next page.)

Primary Examiner—Constantine Hannaher
Assistant Examiner—Albert Gagliardi
(74) Attorney, Agent, or Firm—Knobbe, Martens, Olson & Bear, LLP

(57) ABSTRACT

The present invention may provide a particle or radiation detector or imager which may be used for accurate recording of medical (2-D) X-ray images. The imager includes at least one detector panel. The detector panel includes a microgap detector with an array of pixel electrodes of a novel form. Each pixel electrode is insulated from a planar cathode by means of an insulating layer. Each pixel electrode is connected to an underlying contact by means of a via hole in the insulating layer. The insulating layer is preferably conformal with the electrodes.

The underlying contact is connected to an electronic measuring element which preferably lies underneath the electrode and is about the same size as the electrode. The measuring element may be a storage device, a digital counter or similar. A switching transistor is connected to the measuring device. The switching transistor may be a thin film transistor. Alternatively, both measuring element and transistor may be formed in a single crystal semiconductor, e.g. a VLSI, and a complete imager formed from several detector panels in an array.

The drift electrode of the microgap detector preferably includes a photocathode. The photocathode may be directly evaporated onto a phosphor.

43 Claims, 5 Drawing Sheets

OTHER PUBLICATIONS

Van der Marel, J., et al., "Two–dimensional microgap gas chambers on silicon", Nuclear Instruments and Methods in Physics Research, 1995, pp. 181–184.

Breskin, A., et al., "On the high gain operation of low–pressure microdot gas avalanche chambers", Nuclear Instruments and Methods in Physics Reasearch, Feb. 12, 1997, pp. 21–26.

* cited by examiner

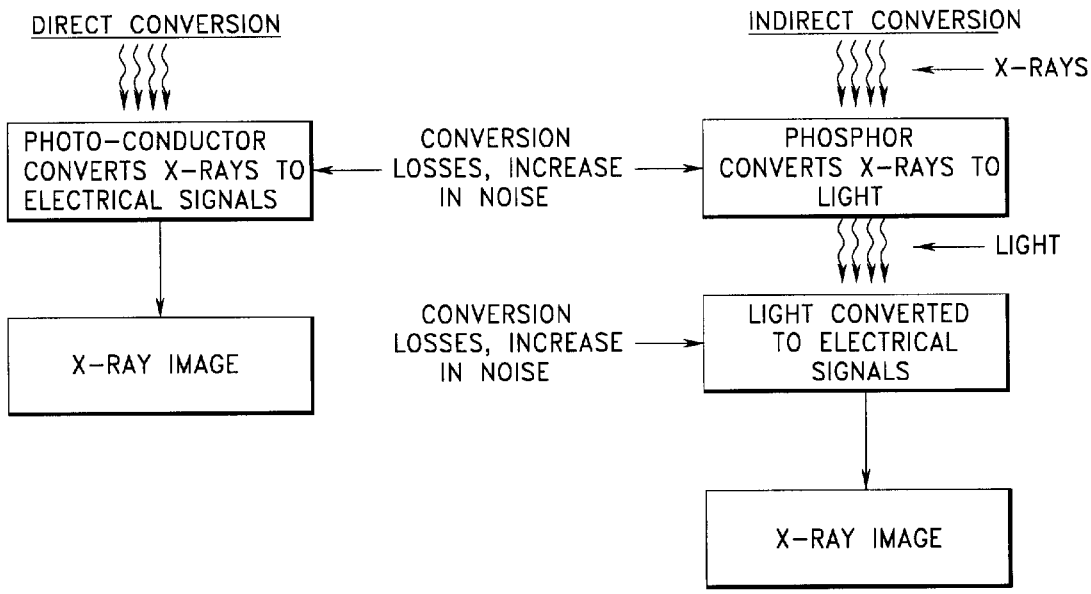
FIG.1
*PRIOR ART*
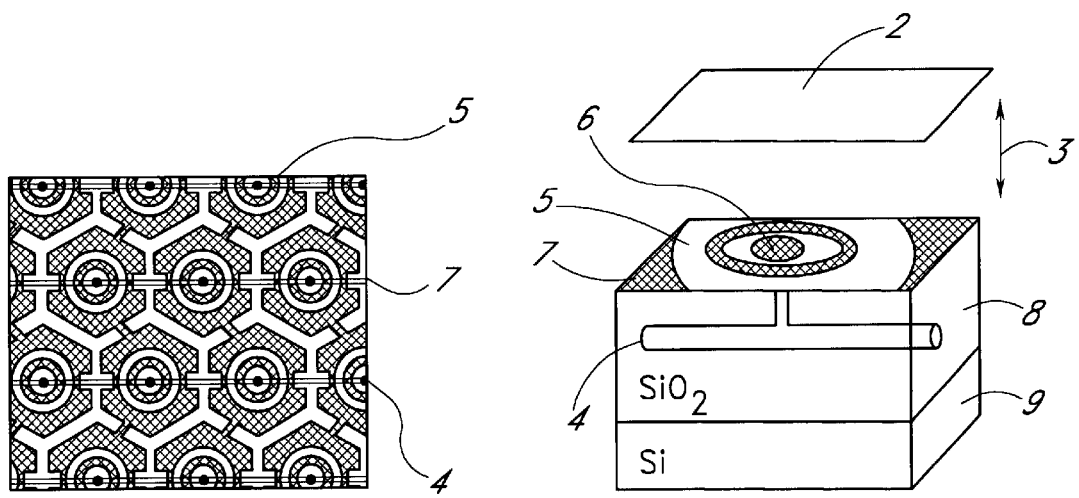
FIG.2A
*PRIOR ART*
FIG.2B
*PRIOR ART*

IMAGER OR PARTICLE OR RADIATION DETECTOR AND METHOD OF MANUFACTURING THE SAME

This application is a continuation-in-part of application Ser. No. 09/021,221, filed Feb. 10, 1998, now U.S. Pat. No. 6,121,622; which is a continuation-in-part of application Ser. No. 08/682,835, filed Jul. 12, 1996, now U.S. Pat. No. 5,731,584, which claims priority to Provisional Application No. 60/001,489, filed Jul. 14, 1995. This application also claims priority to foreign application no. EP 982024762, filed Jul. 23, 1998.

The present invention relates to radiation and/or particle detectors, cameras and imagers, e.g. position sensitive proportional gas counters, scintillation counters, radiation detectors, polarimeters, cameras and imagers, in particular X-ray detectors, X-ray polarimeters, X-ray cameras and X-ray imagers as well as methods of manufacturing the same. The words sensor and detector are considered synonymous in accordance with the present invention.

BACKGROUND OF THE INVENTION

There have been many known attempts to produce a digital medical X-ray imager. The energy distribution of the X-rays in the image plane is determined by the irradiated subject matter, human tissue and bone, resulting in an almost continuous energy spectrum both spatially and on an intensity scale. The image is generally a low contrast image whose gray tones need to be preserved for accurate diagnosis. Such an X-ray image has conventionally been recorded successfully on film in an analogue way. Digital recording devices determine the intensity averaged over picture elements or pixels. The physical detection process and the spacing of the pixels determines the resolution of the device. The intensity at each pixel is normally binned into one of a finite number of levels. Hence, the gray scale resolution is limited to this number of levels rather than being a continuous spectrum of values. All known devices attempt to optimize resolution and gray scale performance but are usually limited in one aspect or another.

The X-rays may be detected directly or indirectly, e.g. a direct conversion of X-rays to an electrical output or first a conversion to visible light and then recording the visible light pattern as shown schematically in FIG. 1.

Direct conversion devices include the use of an layer of selenium for attenuating the X-rays and generating free electron-hole pairs for collection by suitable electrodes. They also include other methods such as conversion of X-rays in solid or gas media followed by multiplication of emitted electrons, conversion and charge collection in pixelised CCD cameras.

Indirect conversion devices use phosphors for converting the X-rays into visible light. One improvement has been photostimulable phosphors, known as storage phosphors. These store the image for later activation by red light. The phosphor can be "read" by a scanning laser and emits blue light in accordance with the stored image. The emitted light is collected and detected by a photomultiplier.

Another improvement is represented by the XRII described in the article by P. M. DeGroot, "Image intensifier design and specifications", Proc. Summer School on Specification, Acceptance, Testing and Quality Control of Diagnostic X-ray Imaging Equipment, Woodbury, USA, 1994, pages 429–60. In this device X-rays are converted to light in a large curved phosphor screen. The resulting fluorescence illuminates a photocathode which liberates electrons and is evaporated directly onto the inside of the phosphor. The electrons are accelerated through a large electric potential, e.g. 25 kV, and electrostatically focussed by electrodes onto a small diameter output phosphor which may be observed by a video camera. The device has the advantage that the electron energy is increased by the acceleration thus counteracting to a certain extent some of the conversion loss but has the serious disadvantages of being very bulky giving limited access to the patient, image distortion, loss of image contrast and high cost and complexity.

A microgap sensor is known from the article "The Microgap Chamber", by F. Angellini et al., Nuclear Instruments & Methods in Physics and Research, Sect. A (1993), pages 69–77. Such devices can detect X-rays however they are mainly used for detection of particles. Microdot detectors as described by Biagi et. al. in the article "Further experimental results of gas microdot detectors", Nuclear Instruments and Methods in Physics Research, A392 (1997) pp 131–134, 4th International Conference on Position Sensitive Detectors, Manchester, Sep. 9–13, 1996 use an electrode arrangement as shown schematically in FIGS. 2A and B. FIG. 2A shows a top view of the electrodes which include anodes 6 in the center connected to an anode readout bus 4 and cathodes 7 arranged around each anode 6 and connected to a cathode readout bus. Between the cathode 7 and the anode 6 one or more field electrodes 5 may be placed. The planar electrode arrangement and read-out busses may be conveniently made using standard semiconductor processing techniques starting from a planar substrate such as a glass plate or a semiconductor, e.g. silicon wafer 9, oxidizing the wafer to form an insulating layer 8 and depositing the electrodes 5,6,7. A gap 3 (typically 3 mm) is provided between the planar electrode arrangement and a cathodic drift electrode 2 which is filled by an ionisable gas. An electric potential is provided between the drift electrode and the electrode arrangement. A high energy charged particle entering the device via the drift electrode 2 causes release of at least one electron. This electron is accelerated towards the nearest anode or anodes 6 causing further collisions with atoms of the ionisable gas thus releasing more electrons until an avalanche is produced. The arrival of the avalanche at one or more anodes 6 is detected by electronic circuitry connected to the read-out busses. These known devices can detect high-energy charged particles and record a complex 2-D X-ray image but at low detection efficiency. Hence, they are unsuitable for detecting complex X-ray images.

An object of the present invention is to provide a particle or radiation detector or a radiation, especially an X-ray imager which provides good localization resolution and a wide intensity scale.

A further object of the present invention is to provide a particle or radiation detector or a radiation, especially an X-ray imager with reduced bulk.

Another object of the present invention is to provide a particle or radiation detector or a radiation, especially an X-ray imager with reduced manufacturing cost and complexity.

Yet another object of the present invention is to provide a large size particle detector or a radiation, especially an X-ray imager.

SUMMARY OF THE INVENTION

The present invention provides a microgap detector comprising: a planar cathode; at least an anodic electrode on a first insulation layer, said anodic electrode being separated and insulated from said cathode by said first insulation layer; a planar cathodic drift electrode substantially parallel to said planar cathode, said planar cathode and said drift electrode being separated by a gap fillable with an ionisable gas, said gap being considerably greater than the thickness of said first insulating layer, said anodic electrode being located in the gap between said cathode and said drift electrode, and said anodic electrode being connected to an underlying conductive layer through a via hole in said first insulating layer. Preferably an electronic measuring device is provided with each anodic electrode, preferably immediately below and within the area thereof. The measuring device may be a charge storing device such as a capacitor or a digital counter, for instance.

The present invention also provides a method of manufacture of a microgap detector, comprising the steps of: forming a substrate with a first conductive layer, forming a second conductive planar cathode layer, depositing a first insulating layer onto said second conductive planar cathode layer, forming a via hole through said first insulating layer to said first conductive layer, forming at least one anodic electrode on said first insulating layer in contact with said first conductive layer through said via hole, mounting a cathodic drift electrode substantially parallel to said first conductive cathode layer, said first conductive cathode layer and said cathodic drift electrode being separated by a gap, said gap being considerably greater than the thickness of said first insulating layer and said anodic electrode lying between said first conductive planar cathode layer and said cathodic drift electrode.

The method of manufacture is particularly suitable for the production of gaseous electron multipliers for large size X-ray imagers independent of limitations imposed by silicon wafer processing equipment.

The present invention also includes a detector panel comprising: a planar cathode, a two dimensional array of a plurality of anodic pixel electrodes on a first insulation layer, each said anodic pixel electrode being separated and insulated from said cathode by said first insulation layer, a planar cathodic drift electrode substantially parallel to said planar cathode, said planar cathode and said drift electrode being separated by a gap fillable with an ionisable gas, said gap being considerably greater than the thickness of said first insulating layer, said anodic pixel electrodes being located in the gap between said cathode and said drift electrode, and a plurality of electronic measuring elements, each electronic measuring element being connected to one of said anodic pixel electrodes. The electronic measuring elements may be one of a charge storing device, e.g. a capacitor and a digital counter. The detector panels may be placed adjacent to each other to form a strip imager or be placed in a two-dimensional overlapping array to form a rectangular imager.

The present invention with its advantages and embodiments will be described with reference to the following drawings. The dependent claims define further individual embodiments of the present invention.

BRIEF DESCRIPTION OF THE DRAWINGS

FIG. 1 shows conventional direct and indirect conversion of X-rays to form an X-ray image.

FIGS. 2A and 2B are schematic representations of a conventional microdot particle detector.

DESCRIPTION OF THE ILLUSTRATIVE EMBODIMENTS

The present invention will be described with reference to certain embodiments and with reference to particular drawings but the invention is not limited thereto but only by the claims. The figures are not considered limiting to the present invention. In the figures certain dimensions, particularly the thickness and separation of certain layers may be exaggerated in order to improve clarity. Further, the present invention will described mainly with reference to a two-dimensional X-ray imager but the invention is not limited thereto. The present invention includes radiation and/or particle detectors, cameras and imagers, e.g. position sensitive proportional gas counters, scintillation counters, radiation detectors, polarimeters, cameras and imagers, in particular infra-red, ultraviolet, visible light or X-ray detectors, infra-red, ultraviolet, visible light or X-ray polarimeters, infra-red, ultraviolet, visible light or X-ray cameras or infra-red, ultraviolet, visible light or X-ray imagers.

Figure 3:
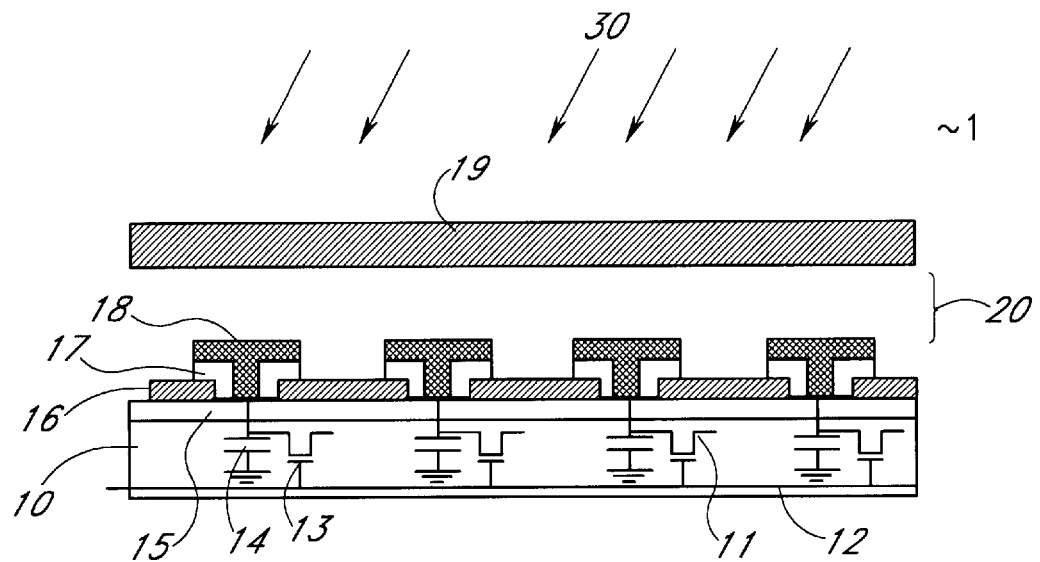
FIG. 3 is schematic cross-sectional representation of a part of a microgap imager in accordance with an embodiment of the present invention.

FIG. 3 is a cross-sectional view of the electrode arrangement of an imager 1 in accordance with one embodiment of the present invention. The imager 1 includes a planar cathode 16 on a first insulating layer 15 and a plurality of discrete pixel anodes 18 arranged in the form of an array or grid and separated and insulated from the cathode 16 by means of a second insulation layer 17. The discrete pixel anodes 18 of the present invention are arranged in a array similar to the sensor array forming the pixels of a digital camera, and will be described as "dot anodes" as the signal from each anode 18 is converted into a dot on a suitable viewing device, e.g. a photosensitive film or a display, for instance a liquid crystal display LCD. The first and second insulating layers 15, 17 may be made of any suitable insulating material, e.g. silicon dioxide, but it is preferred if at least the second insulating layer is polymeric. A polymer is a substance the molecules of which are multiples of low-molecular weight units. High temperature stable polymers are preferred. A drift electrode 19 is placed substantially parallel to the cathode 16 to form a gap 20 and at a distance of a few mm from the anode 18. The gap 20 is filled with an ionizing gas called the target gas. Suitable ionizing gases may be Argon/Ethane or Argon/Methane mixtures such as a 90/10 mixture of Argon/Methane known as p-10 gas, pure Dimethylether (DME) or any mixture of DME (70 to 80%) and $CF_4$ or $CO_2$ to increase the drift velocity, mixtures of DME and light noble gases such as Helium or Neon, e.g. 70–80% Ne, 30–20% DME, mixtures of DME and heavy noble gases such as Xenon or Argon, e.g. 50–70% Ar, 50–30% DME, as well as Argon-Isobutane-Freon-methane mixtures, e.g. mixtures having the relative proportions 70/23/3/4 of Ar/Isobutane/Freon/Dimothoxy Methane or similar. The pressure of the target gas may be any suitable pressure, and may vary between 0.1 Bar to 6 Bars although it is preferred if the pressure is close to atmospheric pressure for terrestrial use. The drift electrode 19 is normally at a large negative potential, typically of the order of −2000 Volts for an atmospheric gas filling, in order to attract the positive ions generated by the collisions in the ionisable gas. The drift electrode 19 may be made from a photocathode material having the property that it emits electrons when photons 30 are incident upon it. A drift electrode 19 suitable for receiving X-ray or γ-radiation and generating photoelectrons may be made of a thin layer of low atomic number such as Beryllium having a thickness of 0.5 to 2 mm, and coated with a layer of high atomic number such as Gold having a thickness of 10 to 50 nm. Drift electrodes 19 in accordance with the present invention may also be sensitive (i.e. generating electrons from incident radiation) to ultraviolet, visible and infrared light, e.g. coated with such materials as Yttrium, Caesium, Caesium Iodide, Caesium Antimonide, Potassium Caesium Antimonide, Sodium or combinations of other rare earth elements. Drift electrode 19 may also include Chromium, Tungsten, or Tantalum and may be protected by a layer of Boron, Boron Carbide or Carbon to prevent damage thereto.

It is particularly preferred in the present invention if the drift electrode 19 comprises a photocathode layer and a layer on the radiation receiving side for conversion of incident radiation and/or particles into electromagnetic radiation, e.g. light, which can be converted by the photocathode layer into electrons. The conversion means may be a phosphor. It is particularly preferred if the photocathode is evaporated directly onto the phosphor layer. The photocathode may be evaporated onto one major surface of a thin plate made from an inert window material such as glass or quartz, with the phosphor layer on the other major surface. It is particularly preferred if the phosphor converts incident X-rays to bluish light which provides efficient ejection of electrons from the photocathode.

Preferably each dot anode 18 has a smooth perimeter without any sharp edges to cause electrically high stressed points. Preferably, the shape of the periphery of dot anodes 18 is a circle. Preferably, the anodes 18 are substantially co-extensive with the second insulation layers 17 thus generating a high electric field between the outer edge of the anodes 18 and the underlying cathode 16. Preferably, the overlap of each anode 18 over the cathode is as small as possible in order to make the anode-cathode capacitance as low as possible. Typically, the anodes 18 may be at or very close to ground potential. Cathode 16 is placed under a negative potential of a few hundred Volts, e.g. between −100 and −800, typically −300 to −500 Volts for detector operation at atmospheric pressure. The high electric field at the edges of the anodes 18 assists in accelerating the electrons and creating the electron avalanche and also draws this avalanche strongly to one of the anodes 18. The anodes 18 are connected through the first insulating layer 15 to electronic measuring circuitry 11–14 for recording the arrival of avalanches at each anode 18. This electronic circuitry is preferably located in or on a semiconductor substrate 10 which lies immediately below the first insulating layer 15. The electronic circuitry 11–14 is preferably small enough so that it lies within the area defined by the spacing between adjacent anodes 18. The electronic circuitry 11–14 may typically includes an electronic measuring device with a readout switching means, e.g. a storage capacitor 14 connected between each anode 18 and ground, whose positive terminal is connected to the source of a transistor 13, e.g. a Field-Effect Transistor (FET) but the invention is not limited thereto. Any form of electronic circuitry which can record the number or magnitude of the electron avalanches striking an anode 18 may be used. In particular, a digital counter may be used to count the number of charge pulses received by each anode 18. Preferably, the anodes 18 should be so arranged as to shield transistors in the electronic circuitry 11–14 from direct radiation, e.g. X-rays.

When an ionizing energy or radiation bundle enters imager 1 it will ionize the molecules of the gas. This process creates ion/electron pairs of which the amount is proportional to the energy loss of the energy bundle in the imager. In accordance with the present invention the ionization may be caused by collision between gas molecules or atoms and the entering particle or may be due to photoelectric ionization when a gas molecule or atom absorbs a photon and ejects one or more electrons. The ionizing energy or radiation bundle may be any elementary particle such as an electron, pion, muon, positron, proton, photon, neutron, etc. Further the particles may be charged particles or molecules with sufficient energy to create ionization. The imager 1 is particularly suitable for use with radiation, e.g. X-rays or non-ionizing particles. For these types of particles and radiation, the drift electrode 19 which forms the window through which the radiation or particles enter the imager 1, is made of a material such that electrons are released from the material into the imager 1 when the radiation or particle strikes the window. Thus, non-ionizing photons may be detected by using a window which includes a photocathode material. Particularly preferred is a combination of a phosphor layer for conversion of the X-rays to visible light, in particular blue light, and a photocathode layer for immediate injection of electrons from the photocathode into the gap 20.

The effect of the ionization is to produce negative electrons and positive ions. Under the influence of the drift field, the electrons will move towards anodes 18 and the positive ions towards the drift electrode 19 or cathode 16 depending on the electric field configuration. In the neighborhood of an anode 18, the field strength becomes very large and the electrons are accelerated. This produces new ionizations together with the creation of a large amount of secondary electrons. These secondary electrons are accelerated and create new ionizations resulting in avalanche formation and gas multiplication. Preferably, the voltage on the anode 18 and cathode 16 should be chosen in order to obtain a proportional mode, i.e. the signal coming from the each anode 18 and going to the preamplifiers of associated electronic sensing equipment is proportional to the energy loss of the particle or radiation in the imager 1 but the invention is not limited thereto.

As a consequence of this avalanche formation, a cloud of electrons and ions is created around one or several of the anodes 18 in dependence upon the spread of the initially deposited charges within gap 20. Thanks to their large mobility, the electrons rapidly reach an anode 18 while the ions take much longer to reach a neighboring cathode 16 or drift electrode 19. Due to the closely packed array of anodes 18 in the form of a grid or matrix, the entry position of each particle or the intensity of the radiation incident on each point on the drift electrode 19 is associated with only one anode 18 or several anodes 18 thus providing a faithful record of the radiation pattern incident on the drift electrode 19. The spreading of the avalanche within the gap 20 for locally deposited charges by radiation is small, typically 50 microns or less.

Figure 4:
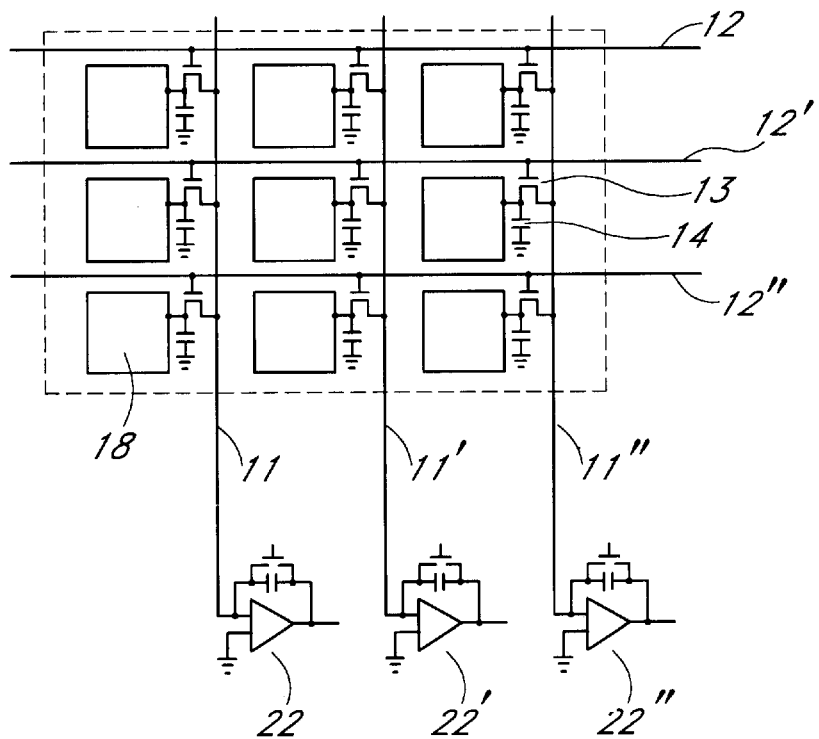
FIG. 4 is a schematic representation of the circuit components of a microgap imager in accordance with an embodiment of the present invention.

As shown in FIG. 4, the gates of the all the transistors 13 in one row may be ganged together on a gate bus 12, 12' 12".

The drains of the transistors 13 in one column may be ganged together on a drain bus 11, 11', 11". The read-out of the imager 1 may start immediately after exposure. Electronic circuitry (not shown) may be provided to impose a voltage pulse on all the gates of the transistors 13 in one row. This turns on all the transistors 13 in the row. Charge from the storage capacitors 14 or outputs from similar devices, e.g. digital counters, flows to a bank of amplifiers 22, 22', 22". The complete signals may be multiplexed and shifted out to an analogue to digital converter and subsequently stored in suitable memory. Where digital counters are used for the detection circuitry 11–14, no digital to analogue converter is necessary and the digital outputs may be shifted out and stored directly. The read out of the charge or counter number continues row-by-row until a digital value representative of the number of pulses received by each anode 18 has been transferred to memory. At the end of the read-out cycle, a charge erase cycle may be initiated and the imager 1 is ready for the next exposure.

Figure 5:
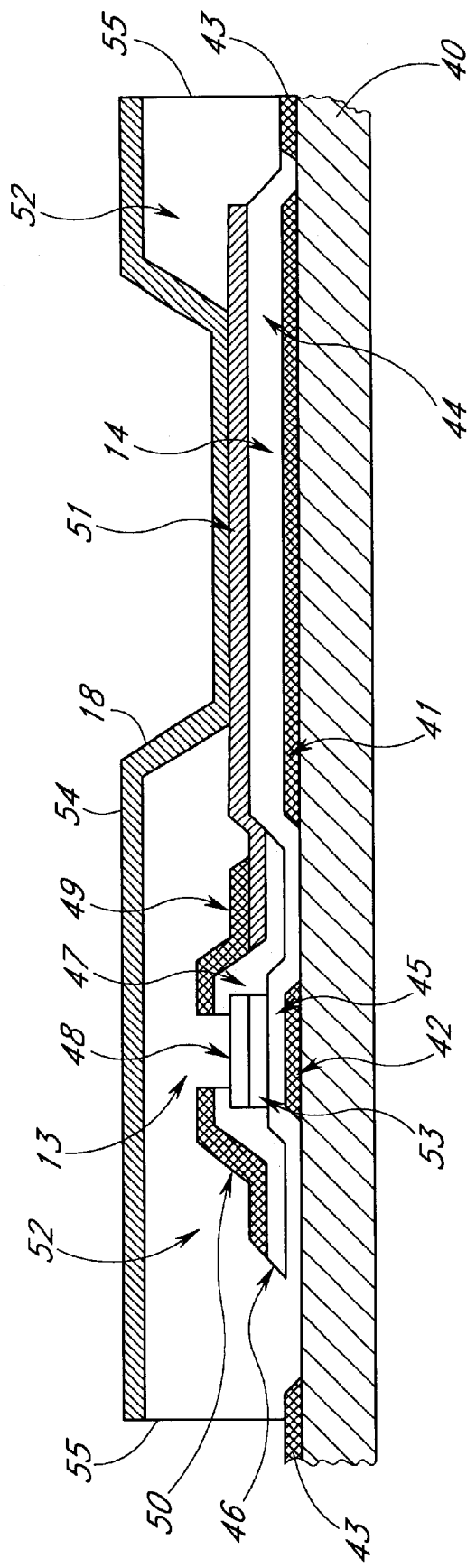
FIG. 5 is a schematic cross-sectional representation of part of a microgap imager in accordance with another embodiment of the present invention.

An embodiment of a method of making an imager 1 in accordance with present invention will be described with reference to FIG. 5. Suitable materials for a substrate 40 preferably have some rigidity and may be insulating and are preferably nuclear radiation resistant if the imager 1 is to be used in High Energy particle detection. Substrate 40 may be made of a flat piece of window glass, quartz, fiber-glass, sapphire, silicon, ceramic, Aluminum Oxide, Aluminum Nitride etc. Substrate 40 may include glass of a few hundreds micron thick, e.g. 200 μm thick. One advantage of using a non-semiconductor substrate, e.g. glass, is that the manufacturing techniques, and therefore the size of the imager 1 may not be limited by the present size of equipment and materials for the production of semiconductor electronic devices, e.g. VLSI's. The upper major surface of substrate 40 may be flattened using conventional grinding and polishing techniques. The upper major surface of substrate 40 may optionally be planarized (not shown) by depositing an insulating layer such as Benzocyclobutene (BCB), Polyphenylquinoxaline, fluoropolymers such as PTFE, Polyimides including fluorinated Polyimide, Silicone Polyimide, Acetylene terminated Polyimide, Polyimide Iso-Indoloquinazdinedione or similar. It is preferred if the insulation layer may be planarized to better than 20% and preferably to better than 90%. Planarization is measured by first forming a step feature on a substrate and then covering this feature with the test material. The planarization in % is given by the % difference between the feature height in the test material and in the substrate divided by the feature height in the substrate. Benzocyclobutene and Acetylene terminated Polyimide both provide planarization in excess of 90%. Benzocyclobutene available for example from Dow Chemical under the trade name Cyclotene™ is particularly preferred as it can be spin or spray coated, has excellent insulation and planarization properties and is adequately radiation resistant.

On the major surface of substrate 40, a patterned metal layer 41, 42, 43 is formed comprising a planar cathode 43, a ground electrode 41 for the storage capacitor 14 and the gate electrode 42 of a pixel transistor 13. The patterned metal layer 41–43 may be formed by the deposition of a conductive material for example Al, e.g. by sputtering, or by any other suitable technique. The metal layers 41–43 may be patterned lithographically by application of a photo-resist followed by illumination and removal of the unwanted areas of the resist and etching of the metal layers 41–43. Alternatively a lift-off technique can be used.

The thin film transistor 42, 45–50, 53 may be formed using an active layer 53 of hydrogenated amorphous silicon. Fabrication methods of transistors are well known to the skilled person and are described, for instance, in the "Introduction to Microelectronics Fabrication", by R. C. Jaeger, published by Addison-Wesley, 1988.

The dot anodes 54 are insulated from the cathode 43 by means of an insulation layer 52. For high energy physics applications, e.g. as a scintillation detector, it is preferable if the insulation material can withstand 100 MRad over 10 years without functional failure. Insulation material for insulation layer 52 preferably has a breakdown strength greater than 100V/micron (as tested for instance in accordance with ASTM D 149) and a dielectric constant less than 5 (as tested for instance in accordance with DIN 53 483 at 50 Hz and 1 Mhz or ASTM D 150 at 50 Hz or 1 GHz). Further advantageous properties are low water uptake, low dielectric constant, good thermal stability, high glass transition temperature and good adhesion to metals. In accordance with the present invention, the insulation layer 52 is preferably a polymer, preferably a polymer with high temperature stability. In particular, layer 52 may be any one of Benzocyclobutene (BCB), Polyphenylquinoxaline, fluoropolymers such as PTFE, Polyimides including fluorinated Polyimide, Silicone Polyimide, Acetylene terminated Polyimide, Polyimide Iso-Indoloquinazdinedione or similar insulating polymers. It is advantageous if the insulation layer 52 is uniform in thickness. This reduces the possibility of unexpected early breakdown at a thin section of insulation. Further, as the gain of the imager 1 is dependent on the thickness of the insulation layer 52 it is advantageous to maintain the thickness of this layer within close tolerances. It is preferred if the insulation layer 52 may be made from a material which can be planarized to 20% or better and preferably 90% or better without requiring mechanical flattening. Polyimide including photosensitive polyimides such as Probyimide™ 200, 300, 400 or 10000 series from Ciba Geigy, Basel Switzerland may provide planarization better than 20% and can be spin coated. Benzocyclobutene and Acetylene terminated Polyimide both may provide planarization in excess of 90%. Benzocyclobutene, for example available under the trade name Cyclotene™ from Dow Chemical, USA, is particularly preferred as it can be spin or spray coated, has excellent insulation and planarization properties and, surprisingly, is adequately radiation resistant. The distance between dot anode 54 and cathode 43 is determined by the thickness of insulation layer 52 and may be between 5 an 50 microns, preferably between 10 and 25 microns. The spacing between the dot anode 54 (anode pitch) may be as little as a few tens of microns up to several hundred microns, and is typically of the order of 100 to 200 microns. The dot anodes 54 are preferably made of conductive material which shields the underlying pixel readout transistor 13 from X-rays or other radiation. To obtain the necessary conductivity and shielding, it is advisable if the anode material is a metal, for instance Aluminum, Copper or Gold. Gold is particularly preferred as it is highly resistant to the products of electron avalanches and hence, is insensitive to aging. Intermediate metal layers, for instance of Titanium, may be used between the anode 18 and insulation layer 52 or between cathode 43 and substrate 40 in order to improve the adhesion of the anode and cathode metals respectively to the underlying insulation. The insulation layer 52 should not be substantially wider than the anodes 18. It is particularly preferred in accordance with the present invention if the width of the anodes 18 and the insulation layer 52 are the same, or at least the same to within ±0.5 micron. It is preferred if the periphery of anodes 18 is smoothly rounded as smoothly radiused edges to the anodes 18 reduce electrical failures.

A preferred method of making the imager 1 in accordance with the present invention will now be described. A glass substrate 40 of about 300 micron thickness, for instance glass of type DESAG 263 from Schott, Mainz, Germany is cleansed in a mixture of Sulfuric acid and Hydrogen Peroxide and subsequently dried. Next conductive layers 41–43 are formed. A Titanium layer having a thickness of a few tens of microns, typically 30 µm, is sputtered onto the glass surface followed by a layer of Gold or Aluminum of at least 0.5 µm thickness. Optionally, a further Titanium layer may be deposited onto the Au or Al. The layers may be patterned to form cathode 43, gate electrode 42 and ground electrode 41 The layers 41–43 may be patterned by deposition of a positive photoresist, imaging the resist layer through a mask, removing the imaged parts of the resist layer with solvent and etching the Al or Au and Ti layers using a wet etch process.

Next insulating layer 44, 45 is formed. This may be any suitable insulating material for example, polyethylene terephthalate film or BCB applied to a suitable thickness, e.g. 50 microns. The insulating layer is patterned and etched to expose the cathode layer 43. Onto the insulating layer 45, a thin film transistor 13 is fabricated using conventional techniques, e.g. formation of a hydrogenated amorphous silicon layer 53, doped hydrogenated amorphous silicon source and drain regions 47, 46, source and drain electrodes 49, 50 and an optional insulating and barrier layer 48, e.g. silicon nitride. At the same time the other electrode 51 of the capacitor 14 is formed in contact or integral with the source electrode 49.

A layer 52 of polymer in the range 5 to 50 microns thick and typically 10 microns thick is then spun-coated onto the complete substrate. The polymer may be Polyimide, e.g. Probyimide from Ciba-Geigy, Basel Switzerland. It is particularly preferred if layer 52 is BCB, e.g. from Dow Chemical, USA. Insulation layer 52 is then patterned to form the through holes to the metal layer 51. This may be done by applying a photo-resist, illuminating it and removing the unwanted areas of the photoresist followed by etching of the insulating layer 52 using the metal layer 51 as an etch stop. Alternatively and preferably, insulating layer 52 is a photosensitive material such as one of the Probyimide™ 200, 300, 400 or 10000 series from Ciba Geigy, Basel Switzerland as the photo-resist step may be omitted and the insulating material exposed through a mask and the unwanted areas removed. This step is followed by deposition of another layer of conductive material 54, for example Al or Au. Optionally, a Ti layer may be deposited before the Al or Au layer. The conductive layer 54 forms contact with the electrode 51 of the storage capacitor 14through the via hole created by the photolithographic etching step of the insulating layer 52. A positive resist is deposited onto the surface of the conductive layer 54 and illuminated with UV light through a mask having the pattern of the subsequent dot anodes 18. The illuminated parts of the resist layer are removed with solvent and the Al, Au, Au/Ti or Al/Ti conductive layer 54 is wet etched to form dot anodes 18.

The dot anodes 18 are used as a mask for the anisotropic etching of the polymer layer 52. This is a so called "self-alignment technique". The polymer layer 52 not protected by the anodes 18 can be removed by means of a dry etching technique, e.g. RIE (Reactive Ion Etching), in order to form the insulation layer 52 coextensive with the dot anodes 18. An alternative method for etching the polymer layer 52 is Scanning Laser Ablation (SLA). The non-protected polymer is removed by means of a wide scanning laser beam from a TEA-$CO_2$ laser or an excimer laser. This is again a so called "self-alignment technique", which is sometimes referred to as conformal masking in SLA technology. The etch procedure is continued up to the cathode layer 43. If the etching process is carried out correctly the polymer insulation 52 should be co-extensive with the anodes 18, in particular the edges 55 of the polymer insulation 54 should be within ±0.5 micron of the edges of the dot anodes 18 and the edges 55 of the insulation layer 52 should be substantially vertical with little or no undercut underneath the anodes 18. It is preferred if the overlap of anode 18 over cathode 43 is kept as small as possible, e.g. about 5 microns, in order to lower the anode-cathode capacitance compared to that of the capacitor 14.

Subsequently, connections are made to the anodes, cathodes, drain, gate and ground electrodes 41–43, 50, 51, 18, for connection to processing electronic circuitry (not shown).The cathode and anode structure is fitted into a housing, the drift electrode is mounted and the housing sealed and filled with the target gas.

In order to improve the resolution of the imager 1 described above, the spacing of the dot anodes 18 should be reduced to a minimum. Reducing the shielding area of the anodes 18 requires producing pixel readout transistors 13 of a minimum size which in turn requires the best possible processing techniques and semiconductor materials, e.g. single crystal silicon rather than amorphous silicon. One alternative method of producing the imager 1 as shown in FIG. 5 is to use techniques developed for the production of Active Matrix Liquid Crystal Displays (AMLCD). These may include transfer of unprocessed or pre-processed essentially single crystal semiconductor wafers or tiles of semiconductor wafers onto glass substrates to form a larger structure as described in U.S. Pat. Nos. 5,206,749; 5,256, 562; 5,258,320; 5,258325 and 5,317,236 as well as co-pending European Patent Application number 97109769.6, entitled "Low temperature adhesive bonding method for composite substrates" all of which are incorporated herein by reference. The electronic components of the present invention may be formed in such wafers or tiles prior to transfer.

The above devices have been described with reference to a pixel electronic measuring device using charge collection from the anodes 18, e.g. a storage capacitor 14 which is in principle an analogue element requiring an analogue to digital converter in the electronic circuitry servicing the imager 1. An all digital imager 1 in accordance with the present invention includes the use of a digital measuring device such as a digital counter to count the number of pulses from each anode 18 during one exposure. Digital counters are well known to the skilled person, e.g. those comprising shift registers or flip-flops. A digital measuring device such as a digital counter may require more semiconducting surface area than a simple pixel readout transistor 13 and storage capacitor 14 as described above. In order to keep resolution as high as possible the digital counter beneath each anode 18 must be kept to the smallest size possible, hence designs of digital counters are particularly preferred which are small in semiconductor area as well as being high speed. Such designs may require advanced processing techniques and materials, e.g. those known to the skilled person from the production of VLSI circuits, in particular CMOS processing. Such processing is presently limited to the size of high quality single crystal semiconductor wafers which can be produced and processed reliably, currently about 200 mm in diameter. This size is normally smaller than the width of the object to be X-rayed, namely the human body. Hence, it is preferred in accordance with the present invention to assemble several detector panels together to form a complete imager 1.

Figure 6:
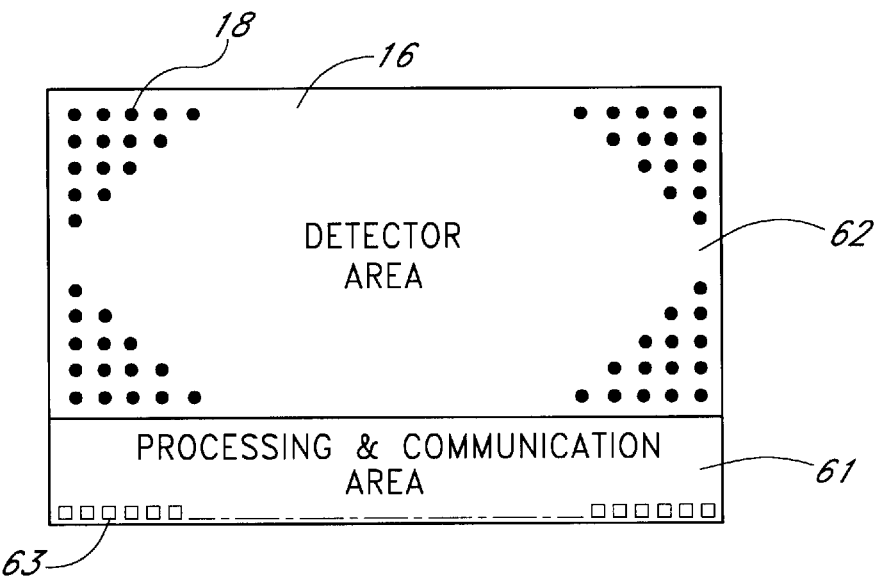
FIG. 6 is a schematic top view of an imager panel in accordance with another embodiment of the present invention.

A further embodiment of the present invention will be described with reference to FIGS. 6 to 9. FIG. 6 shows a schematic top view of the anode array of one detector panel 60 of an imager 1 in accordance with this embodiment of the present invention. The panel 60 may include a single crystal semiconductor wafer, e.g. a silicon wafer. The panel comprises a detector array 62 including the anodes 18 spaced by an insulated gap from a planar cathode 16 and a processing and communications area 61 which may be connected to other electronic equipment by means of the bonding pads 63. Each anode 18 of detector array 62 is connected to an electronic measuring device, e.g. a digital counter or a storage capacitor as well as a pixel readout switching means, e.g. a transistor or transistors, within or on the semiconductor wafer at the back of the detector array 62. Each electronic measuring device, e.g. digital counter, storage capacitor, and pixel readout transistors may be shielded by an anode 18 from X-rays or other radiation is preferably small enough to lie totally within the area of an anode 18.

The processing and communication area 61 may include pre-amplifiers, addressing and zeroing circuitry for each electronic measuring device as well as the connections for the voltage supplies and ground potential for the cathode 16, the electronic measuring devices and the pixel readout transistors.

Figure 7:
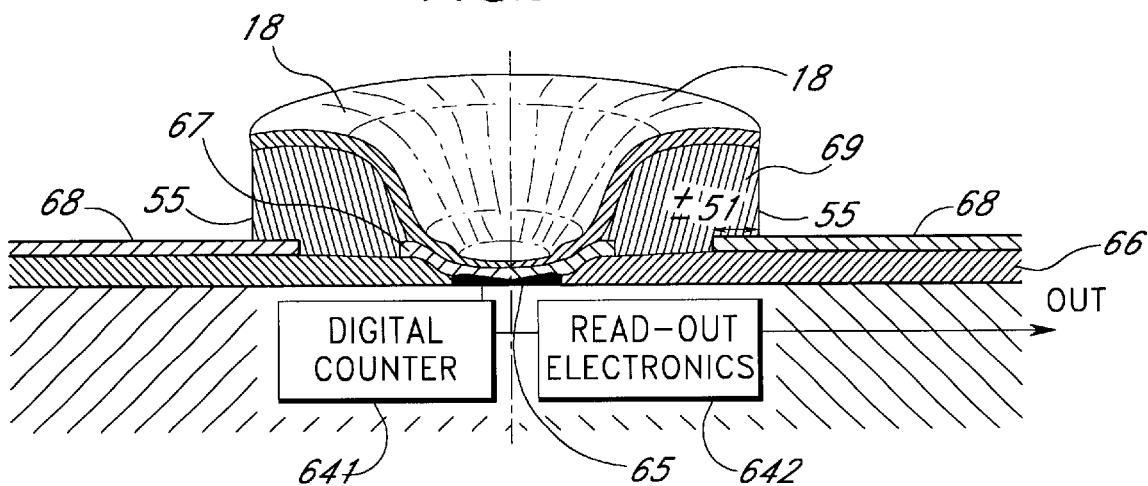
FIG. 7 is a schematic cross-sectional detailed view of a dot anode in accordance with an embodiment of the present invention.

As shown in detail in FIG. 7, anodes 18 are mounted on an integrated circuit 64 including the electronic measuring devices 641 such as the storage capacitors 14 or the digital counters and the pixel readout electronics 642 which may include transistors 13 as well as connection lines to the transistors 13 and the anode 18 and cathode 16. Metal contact pads 65 are connected to the input of the pixel electronic measuring device 641 such as a digital counter or a storage capacitor. The integrated circuit 64 includes the electronic circuitry for the detector array 62 as well as the processing and communication area 61 including the bonding pads 63. The IC 64 is processed by conventional techniques, e.g. CMOS processing. On the complete surface of the IC 64 an insulating layer 66 is then formed. This may be formed as part of the CMOS processing of the IC 64, e.g. the formation of a silicon dioxide or silicon nitride layer. Alternatively, the insulating layer 66 may be formed by coating a suitable polymer, e.g. any one of Benzocyclobutene (BCB), Polyphenylquinoxaline, fluoropolymers such as PTFE, Polyimides including fluorinated Polyimide, Silicone Polyimide, Acetylene terminated Polyimide, Polyimide Iso-Indoloquinazdinedione or similar insulating polymers. It is advantageous if the insulation layer 66 is uniform in thickness. It is preferred if the insulation layer 66 may be made from a material which can be planarized to 20% or better and preferably 90% or better without requiring mechanical flattening. Polyimide including photosensitive polyimides such as Probyimide™ 200, 300, 400 or 10000 series from Ciba Geigy, Basel Switzerland may provide planarization better than 20% and can be spin coated. Benzocyclobutene and Acetylene terminated Polyimide both may provide planarization in excess of 90%. Benzocyclobutene (BCB), for example available under the trade name CycloteneT from Dow Chemical, USA, is particularly preferred as it can be spin or spray coated, has excellent insulation and planarization properties and, surprisingly, is adequately radiation resistant. An intermediate metal contact 67 is now formed by patterning the insulation layer 66. When this is a photosensitive material, e.g. photo-BCB, this may be done by exposing the material through a mask and removing the unwanted insulating material to expose the underlying metal contact 65. Alternatively, insulating layer 66 may be patterned by conventional photolithographic techniques. Next a patterned metal layer 67, 68 is formed using conventional metal deposition and photolithographic patterning techniques. A portion 67 of the metal layer makes contact with the contact pad 65 through the hole formed in the insulating layer 66 by the patterning step. Another portion 68 forms the planar cathode. Next an insulating layer 69 is applied. Again this layer may be an insulating layer formed during or after CMOS processing from materials such as silicon nitride or silicon dioxide. However, it is difficult to apply thick layers of such materials, e.g. greater than 10 micron, and it is preferred to apply a polymeric insulating material similar to, or the same as the material mentioned above for the insulating layer 66. The insulating layer 69 is then patterned to form through holes to the intermediate contact 67. This may be done by conventional photolithographic techniques or if the insulating layer 69 is made from photosensitive material this may be done by illuminating the material through an appropriate mask and removing the unwanted material. Next a metal layer is deposited over the complete device and patterned to form anodes 18 connected to the intermediate contact 67 through the via holes in the insulating layer 69. It is preferred if the overlap of anode 18 over cathode 68 is kept as small as possible, e.g. about 5 microns, in order to lower the anode-cathode capacitance.

Subsequently, the dot anodes 18 are used as a mask for the anisotropic etching of the polymer layer 69 using a self-alignment technique such as RIE (Reactive Ion Etching or Scanning Laser Ablation (SLA) as described above. The etch procedure is continued up to the cathode layer 68. If the etching process is carried out correctly the polymer insulation 69 should be co-extensive with the anodes 18, in particular the edges 55 of the polymer insulation 69 should be within ±0.5 micron of the edges of the dot anodes 18 and the edges 55 of the insulation layer 69 should be substantially vertical with little or no undercut underneath the anodes 18.

One or several such panels 60, 70, 80, 90 may be mounted in line and connected to a suitable connector 100 via the bonding pads 63, 73, 83, 93 to form an imager 1 in accordance with an embodiment of the present invention. The connector 100 may be provided with standardized connection means 110 for connection to other electronic equipment. The imager is completed by fitting it into a housing, mounting the drift electrode and sealing and filling housing with the target gas.

The width of such an imager 1 may be sufficient to cover the complete width of the object to be imaged, e.g. the human body. However, the height of the device may not be sufficient for a complete image in one exposure. This can be compensated for by taking a series of contiguous exposures and storing the image of each exposure in a separate part of the memory of a computer. The final image can then be constructed by assembly of the individual part images.

Figure 8:
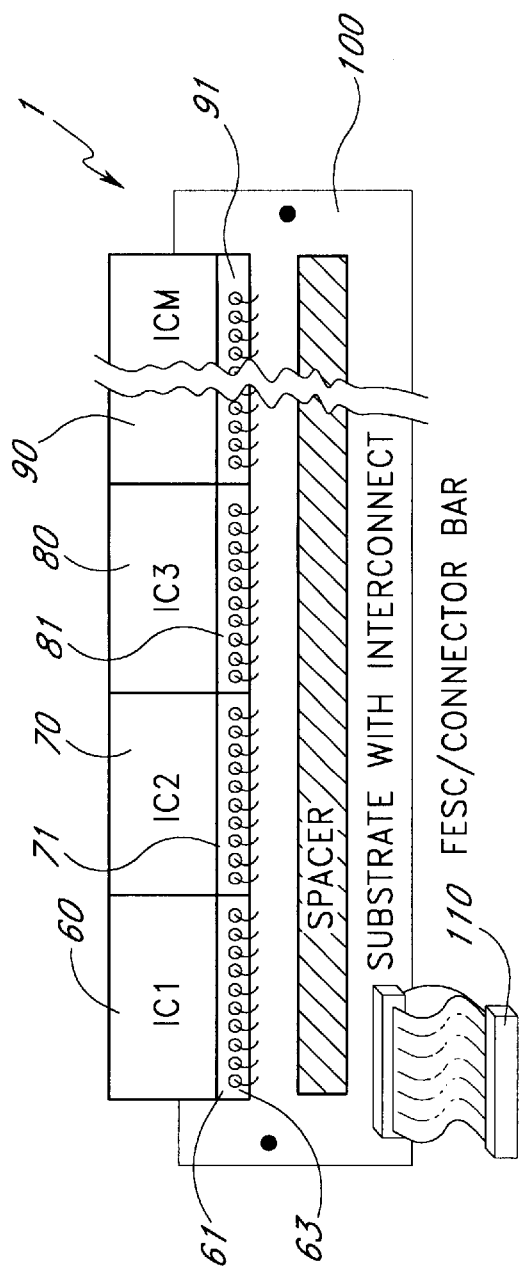
FIG. 8 is a schematic top view of a microgap imager in accordance with another embodiment according to the present invention.
Figure 9:
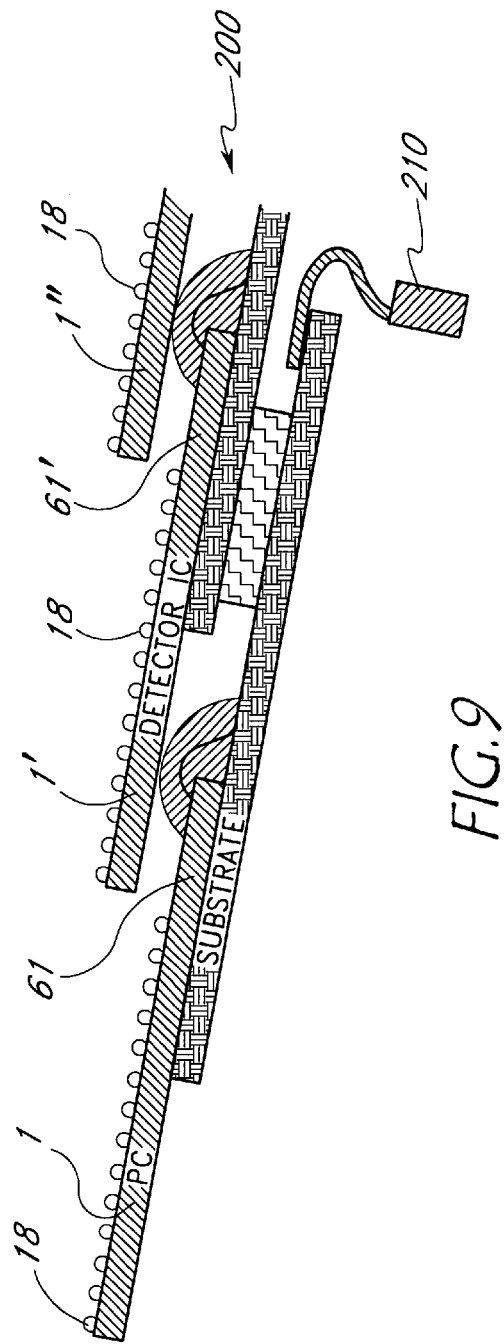
FIG. 9 is a schematic side view of another embodiment of a microgap imager in accordance with the present invention.

In accordance with another embodiment of the present invention, a full size, e.g. rectangular, imager 200 may be prepared as indicated in FIG. 9 by assembly of a plurality of imagers 1, 1', 1" etc of the type shown in FIG. 8. These may be overlapped in such a way that all the anodes 18 are exposed whereas the processing and communication areas 61, 61', 61" are covered by the imager 1', 1" above. All the processing and communication areas 61, 61', 61" of the imagers 1, 1', 1" are through connected to a single final connector 210 which may be attached to suitable memory devices, voltage supplies, electronic processing means such as a computer or datalogger including suitable display devices or printers. The imager 200 is completed by fitting it into a housing, mounting the drift electrode and sealing and filling housing with the target gas.

Although specific embodiments have been described with respect to particular applications, modifications and changes of the illustrated embodiments lie within the scope of the invention. No limitation to the scope of this invention is intended by the illustrated embodiments and/or specific configurations, materials, geometries, etc. described above. The invention is only limited by the scope of the appended claims.

What is claimed is:

1. A microgap detector comprising:
   a planar cathode,
   at least an anodic electrode on a first insulation layer, said anodic electrode being separated and insulated from said cathode by said first insulation layer,
   a planar cathodic drift electrode substantially parallel to said planar cathode, said planar cathode and said drift electrode being separated by a gap fillable with an ionizable gas, said gap being considerably greater than the thickness of said first insulating layer, said anodic electrode being located in the gap between said cathode and said drift electrode, and
   said anodic electrode being connected to an underlying conductive layer through a via hole in said first insulating layer, wherein said planar cathodic drift electrode comprises a photocathode layer.

2. The microgap detector according to claim 1, wherein said anodic electrode comprises a first peripheral portion substantially parallel to said planar cathode and the connection through said via hole is substantially in the middle of said anodic electrode.

3. The microgap detector according to claim 1, wherein said first insulating layer is substantially co-extensive with said anodic electrode.

4. The microgap detector according to claim 1, wherein said anodic electrode is connected to an electronic measuring element insulated from said cathode, said electronic measuring element being in electrical contact with said underlying conductive layer.

5. The microgap detector according to claim 4, wherein said electronic measuring element is one of a charge storing device and a digital counter.

6. The microgap detector according to claim 4, wherein said electronic measuring element is comprised within a semiconducting substrate.

7. The microgap detector according to claim 6, wherein the planar cathode is integral with the semiconductor substrate.

8. The microgap detector according to claim 1, wherein said drift electrode comprises a photocathode.

9. The microgap detector according to claim 1, further comprising a read-out switching means connected to said anodic electrode.

10. The microgap detector according to claim 9, wherein said read-out switching means is a thin film transistor.

11. The microgap detector according to claim 1, wherein said planar cathodic drift electrode is coated with a layer of Gold.

12. The microgap detector according to claim 1, wherein said planar cathodic drift electrode is coated with a material selected from the group consisting of Yttrium, Caesium, Caesium Iodide, Caesium Antimonide, Potassium Caesium Antimonide and Sodium.

13. The microgap detector according to claim 1, wherein said planar cathodic drift electrode is made of a thin layer of a low atomic number material.

14. The microgap detector according to claim 13, wherein said planar cathodic drift electrode is made of Beryllium and has a thickness in the range of 0.5 to 2 mm.

15. The microgap detector according to claim 1, wherein said planar cathodic drift electrode comprises a phosphor layer for converting X-rays into bluish light.

16. The microgap detector according to claim 1, wherein said planar cathodic drift electrode is coated with a rare earth metal.

17. A method of manufacture of a microgap detector, comprising the steps of:
   forming a substrate with a first conductive layer, forming a second conductive planar cathode layer,
   depositing a first insulating layer onto said second conductive planar cathode layer, forming a via hole through said first insulating layer to said first conductive layer, forming at least one anodic electrode on said first insulating layer in contact with said first conductive layer through said via hole,
   mounting a cathodic drift electrode substantially parallel to said second conductive planar cathode layer, said second conductive planar cathode layer and said cathodic drift electrode being separated by a gap, said gap being considerably greater than the thickness of said first insulating layer and said anodic electrode lying between said second conductive planar cathode layer and said cathodic drift electrode, wherein said planar cathodic drift electrode comprises a photocathode layer.

18. The method according to claim 17, further comprising the step of removing the first insulating layer except underneath said anodic electrode.

19. The method according to claim 18, wherein said removing step includes one of reactive ion etching and scanning laser ablation.

20. The method according to claim 17, further comprising the step of forming the cathodic drift electrode from a photocathode layer.

21. The method according to claim 20, wherein the photocathode layer is formed by evaporation onto a plate made of an inert window material.

22. The method according to claim 17, further comprising the steps of forming an electronic measuring element in contact with said first conductive layer, and forming a switching element in contact with said electronic measuring element.

23. The method according to claim 22, wherein said substrate is a semiconductor and said electronic measuring element and said switching element are formed in said semiconducting substrate.

24. The method according to claim 17, wherein said planar cathodic drift electrode is coated with a layer of Gold.

25. The method according to claim 17, wherein said planar cathodic drift electrode is coated with a material selected from the group consisting of Yttrium, Caesium, Caesium Iodide, Caesium Antimonide, Potassium Caesium Antimonide and Sodium.

26. The method according to claim 17, wherein said planar cathodic drift electrode is made of a thin layer of a low atomic number material.

27. The method according to claim 26, wherein said planar cathodic drift electrode is made of Beryllium and has a thickness in the range of 0.5 to 2 mm.

28. In a microgap imager, a detector panel comprising:
   a planar cathode,
   a two dimensional array of a plurality of anodic pixel electrodes on a first insulation layer, each said anodic pixel electrode being separated and insulated from said cathode by said first insulation layer, a planar cathodic drift electrode substantially parallel to said planar cathode, said planar cathode and said drift electrode being separated by a gap fillable with an ionizable gas, said gap being considerably greater than the thickness of said first insulating layer, said anodic pixel electrodes being located in the gap between said cathode and said drift electrode, and a plurality of electronic measuring elements, each electronic measuring element being connected to one of said anodic pixel electrodes, wherein said planar cathodic drift electrode comprises a photocathode layer.

29. The imager according to claim 28, wherein each said anodic pixel electrode is connected to an underlying conductive layer through a via hole in said first insulating layer and each said electronic measuring element is in electrical contact with said underlying conductive layer.

30. The imager according to claim 29, wherein each said anodic electrode comprises a first peripheral portion substantially parallel to said planar cathode and the connection through said via hole is substantially in the middle of each said anodic electrode.

31. The imager according to claim 28, wherein each said anodic pixel electrode is substantially co-extensive with the underlying portion of said first insulating layer and the underlying portion of the first insulating layer does not extend substantially beyond the anodic pixel electrode.

32. The imager according to claim 28, wherein each said electronic measuring element is one of a charge storing device and a digital counter.

33. The imager according to claim 28, further comprising a semiconductor substrate and said electronic measuring elements are comprised within said semiconducting substrate.

34. The imager according to claim 28, wherein said drift electrode comprises a photocathode.

35. The imager according to claim 28, further comprising a plurality of read-out switching means, each read-out switching means being connected to one of said electronic measuring elements.

36. The imager according to claim 35, wherein said read-out switching means is a thin film transistor.

37. The imager according to claim 28 including a plurality of detector panels.

38. The imager according to claim 37, wherein said plurality of detector panels are arranged in a two-dimensional array.

39. The imager according to claim 28, in which said imager is one of an X-ray imager and an X-ray camera.

40. The imager according to claim 28, wherein said planar cathodic drift electrode is coated with a layer of Gold.

41. The imager according to claim 28, wherein said planar cathodic drift electrode is coated with a material selected from the group consisting of Yttrium, Caesium, Caesium Iodide, Caesium Antimonide, Potassium Caesium Antimonide and Sodium.

42. The imager according to claim 28, wherein said planar cathodic drift electrode is made of a thin layer of a low atomic number material.

43. The imager according to claim 42, wherein said planar cathodic drift electrode is made of Beryllium and has a thickness in the range of 0.5 to 2 mm.

* * * * *